US007574134B2

(12) United States Patent  (10) Patent No.: US 7,574,134 B2
Frankel  (45) Date of Patent: Aug. 11, 2009

(54) METHOD OF DETERMINING AT LEAST ONE VARIABLE OF A WDM OPTICAL NETWORK

(75) Inventor: Michael Y. Frankel, Baltimore, MD (US)

(73) Assignee: CIENA Corporation, Linthicum, MD (US)

( * ) Notice: Subject to any disclaimer, the term of this patent is extended or adjusted under 35 U.S.C. 154(b) by 635 days.

(21) Appl. No.: 11/190,110

(22) Filed: Jul. 27, 2005

(65) Prior Publication Data

US 2007/0025730 A1  Feb. 1, 2007

(51) Int. Cl.
*H04B 10/08* (2006.01)

(52) U.S. Cl. .............................. 398/34; 398/79; 398/87
(58) Field of Classification Search .................. 398/25, 398/34, 79, 82, 87
See application file for complete search history.

(56) References Cited

U.S. PATENT DOCUMENTS

| 5,946,129 | A  | * | 8/1999 | Xu et al. | 359/332 |
| 2004/0047026 | A1 | * | 3/2004 | Ng et al. | 359/333 |
| 2007/0258714 | A1 | * | 11/2007 | Little et al. | 398/76 |

OTHER PUBLICATIONS

Runggeratigul et al. "Optimal number of wavelength converters for WDM network design," Tencon 2004 IEEE Region 10 Conference, vol. C, pp. 93-96, Nov. 21-24, 2004.*
"A Genetic Algorithm-Based Method for Optimizing Multiservice Convergence in a Metro WDM Network," Journal of Lightwave Technology, vol. 21, No. 5, pp. 1114 to 1133, May 2003.
"On Distributed Raman Amplification for Ultrabroad-Band Long-Haul WDM Systems," Journal of Lightwave Technology, vol. 20, No. 3, pp. 409 to 416, Mar. 2002.
The Arrayed-Waveguide Grating Based Single-Hop WDM Network: An Architecture for Efficient Multicasting, pp. 1 to 35.

* cited by examiner

*Primary Examiner*—Christina Y Leung
(74) *Attorney, Agent, or Firm*—Clements Bernard PLLC; Christopher L. Bernard; Tyler S. Brown

(57) ABSTRACT

A method of optimizing a WDM optical ring network configuration using a genetic algorithm. Preferably, the method includes the steps of initially defining one or more parameters for a WDM optical network or portion of a WDM optical network and creating a plurality of parents each having a gene structure corresponding to the one or more parameters of the WDM optical network or portion thereof. The parents are then ranked according to predetermined fitness criteria. The highest ranking parents are then mated to form one or more children. Preferably, the children are then optionally mutated before or after testing to ensure that they satisfy predetermined network demands. Suitable children replace lower ranking parents to form new parents. The process is then repeated by mating the highest ranking parent in an effort to further optimize the network. Various steps in the genetic algorithm can be repeated until an optimal design is achieved.

17 Claims, 3 Drawing Sheets

METHOD OF DETERMINING AT LEAST ONE VARIABLE OF A WDM OPTICAL NETWORK

FIELD OF THE INVENTION

A preferred form of the present invention is directed to a method of determining at least one variable of a WDM optical network. More particularly, the present invention is directed to a method that utilizes a genetic algorithm to determine one of more variables in a WDM optical network to create a robust and cost-effective WDM optical network. The variables include but are not limited to the placement of components (e.g., filters, regenerators, wavelength converters, etc.) in the WDM optical network.

BACKGROUND OF THE INVENTION

Various optical networks have been previously proposed for transmitting information including but not limited to audio, video and data from one location to another. Originally, the fiber optic industry used single wavelength transmission links. Multiplexing based on wavelength has been utilized more and more in optical networks to greatly increase transmission capacity over single wavelength transmission links. Specifically, wavelength division multiplexing (WDM) was developed to transmit two optical signals each having a distinct wavelength on a single waveguide. In response to the ever increasing demand, coarse wavelength division multiplexing (CWDM) was developed to further increase the transmission capacity of optical networks. CWDM allows generally up to eight different channels to be stacked with channel spacing of 20 nm. To accommodate even greater transmission capacity demands, dense wavelength division multiplexing (DWDM) has been developed to send a large number of closely spaced optical signals over a single fiber. DWDM systems have channels spaced as close as 0.2 nm.

Several companies have developed component or network products with reconfigurable add/drop multiplexers (ROADM) to permit remote reconfiguration of the wavelength division multiplexers to eliminate or reduce the requirement of a site visit to the node to alter or replace a fixed add/drop multiplexer to achieve the desired modification of the network. Examples of these reconfigurable add/drop multiplexer products are available from companies such as JDSU, Capella Photonics, LightConnect, etc.

As the complexity of optical networks increases with the ever increasing demand for greater network capacity, the task of developing and designing networks is more and more daunting. For example, there are many choices in the technology used to implement OADM nodes. The more sophisticated and advanced the technology, the greater the capability and functionality of the nodes, but generally at the expense of increased costs and reduced reliability. Substantial network-wide benefit can be realized by introducing sophisticated but costly technology only on as-needed basis in the network. Currently, network design and OADM technology selection is predominantly done by estimating only local node requirements, without much regard for the interactions that may span large portions of the network. This process generally produces network designs that are severely suboptimal either in terms of robustness, or in terms of cost.

Accordingly, there exists a need for a method in which variables of an optical network can be readily determined to optimize the network. The variables include but are not limited to the placement of components (e.g., filters, regenerators, wavelength converters, etc.) in the optical network.

OBJECTS AND SUMMARY OF THE INVENTION

An object of the invention is to provide an automated network design process.

Another object of the invention is to provide a method of optimizing network design using a genetic algorithm.

A further object of the invention is to provide a method of optimizing placement of various components of the optical network including, but not limited to, ROSF optical spectrum filters.

Yet another object of the invention is to provide a method of placement of various optical components based on physical and logical network parameters to provide a robust and cost-effective optical network.

It must be understood that no one embodiment of the present invention need to include all of the aforementioned objects of the present invention. Rather, a given embodiment may include one or none of the aforementioned objects. Accordingly, these objects are not to be used to limit the scope of the claims of the present invention In summary, a preferred form of the present invention is directed to a method of determining the placement of one or more optical components in a WDM optical network having a plurality of nodes. The method includes the steps of: (a) initially defining a WDM optical network or portion of a WDM optical network by selecting at least one component of the WDM optical network and at least one of the following: (i) number of nodes of the WDM optical network; (ii) node connectivity paths of the WDM optical network; (iii) physical path characteristics of the WDM optical network; and, (iv) inter-node channel demands of the WDM optical network; and, (b) determining the placement of the at least one component in the WDM optical network or portion of the WDM optical network using a genetic algorithm.

Another preferred form of the present invention is directed to a method of determining at least one variable of a WDM optical network having a plurality of nodes. The method includes the steps of: (a) initially defining one or more parameters for a WDM optical network or portion of a WDM optical network; (b) creating a plurality of parents each having a gene structure corresponding to the one or more parameters of the WDM optical network, (c) mating two of the parent genes to form at least one child having a gene structure that corresponds to the one or more parameters; (d) selectively replacing one or more parents created in step (b) with one or more children created in step (c); (e) setting the at least one variable of the WDM optical network at least in part based on the results from steps (b) through (d); and, (f) evaluating the resultant WDM network design for robustness and cost and repeating steps (c) through (f) as necessary to improve the design A further preferred form of the present invention is directed to a method of determining the placement of one or more optical components in a WDM optical network having a plurality of nodes. The method includes the steps of: (a) initially defining a WDM optical network or portion of a WDM optical network by selecting at least one component of the WDM optical network; and, (b) determining the placement of said at least one component in the WDM optical network or portion of the WDM optical network using a genetic algorithm.

DETAILED DESCRIPTION OF THE PREFERRED EMBODIMENTS OF THE INVENTION

The preferred forms of the invention will now be described with reference to FIGS. 1, 2, 3A and 3B. The appended claims are not limited to the preferred forms and no term and/or phrase used herein is to be given a meaning other than its ordinary meaning unless expressly stated otherwise.

Figure 1:
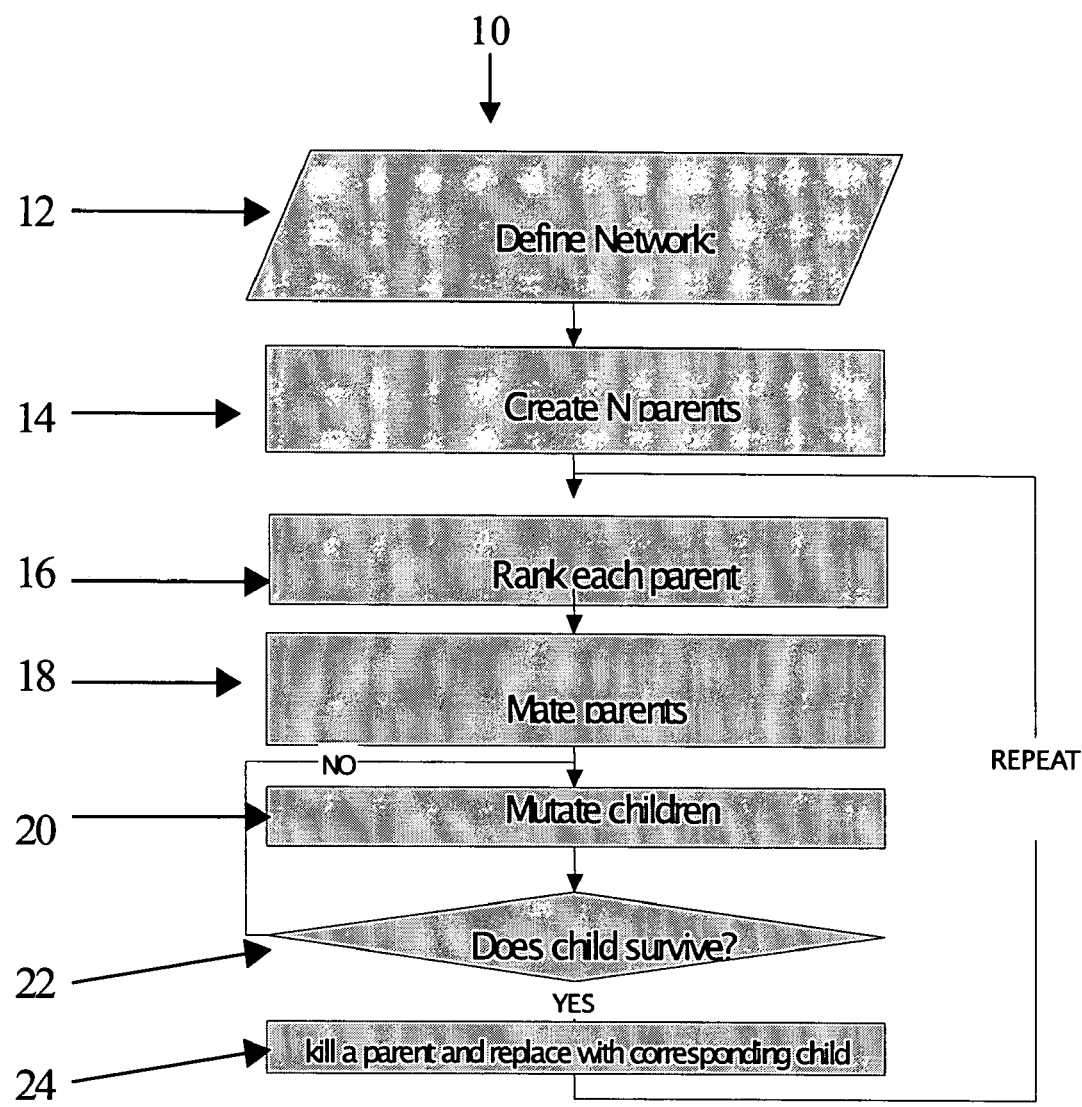
FIG. 1 is a flowchart showing the application of a genetic algorithm to a defined network.
Figure 2:
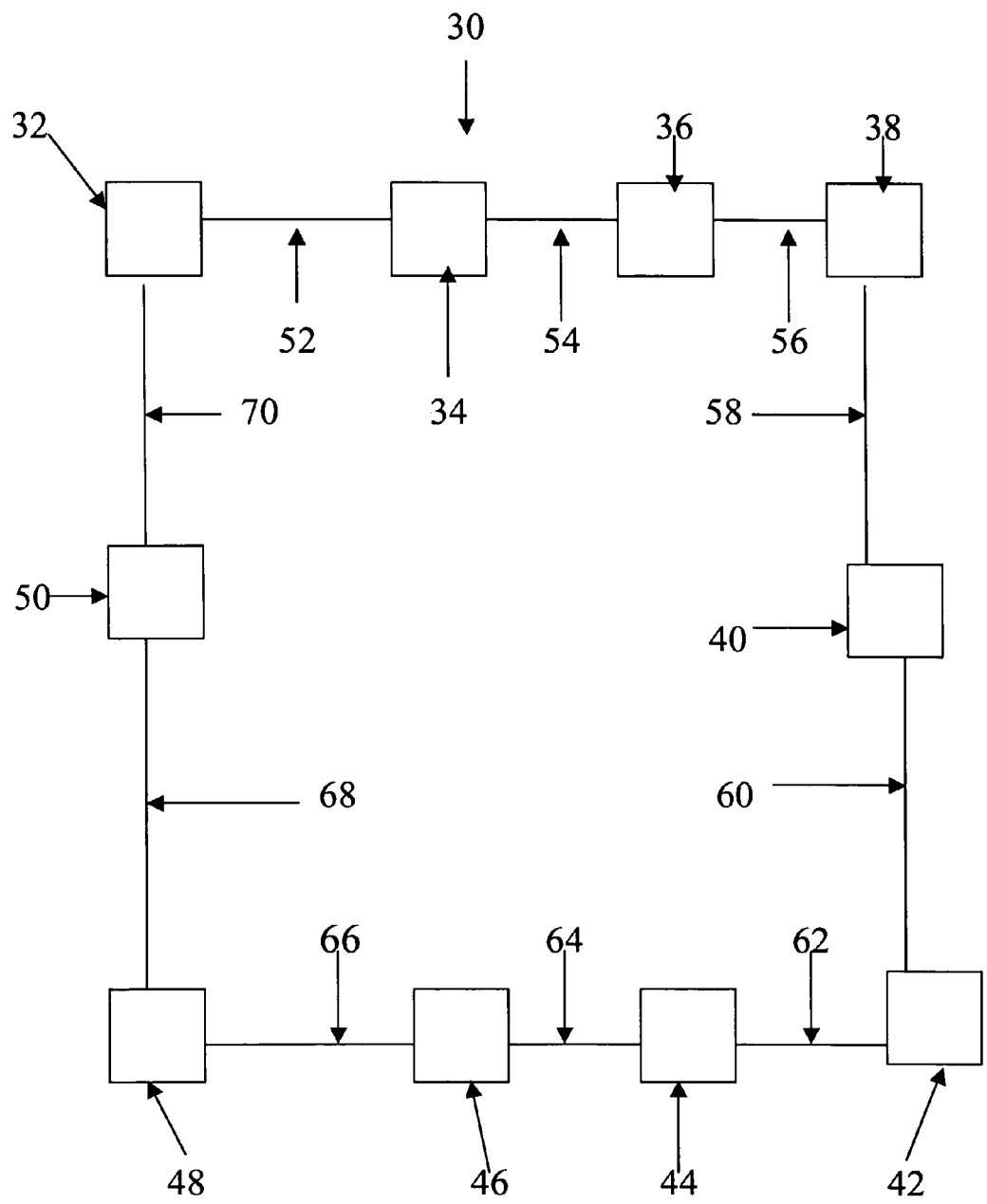
FIG. 2 is a sample of an optical network to be optimized.
Figure 3A:
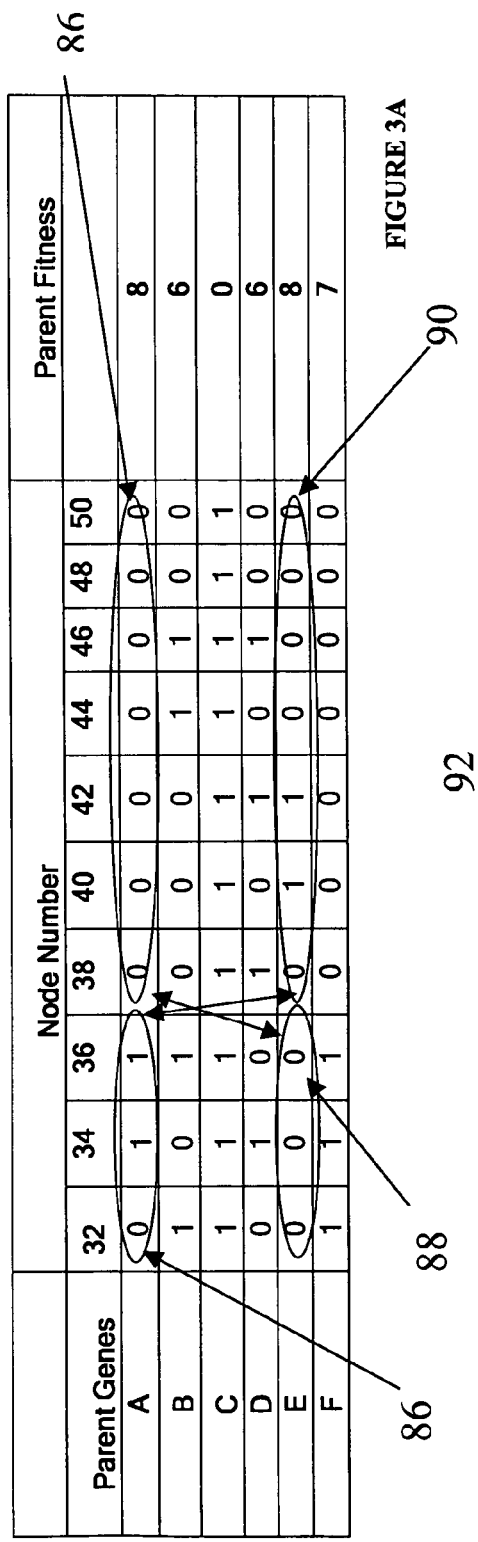
FIG. 3A is a table illustrating how genes are formed, ranked, and split.
Figure 3B:
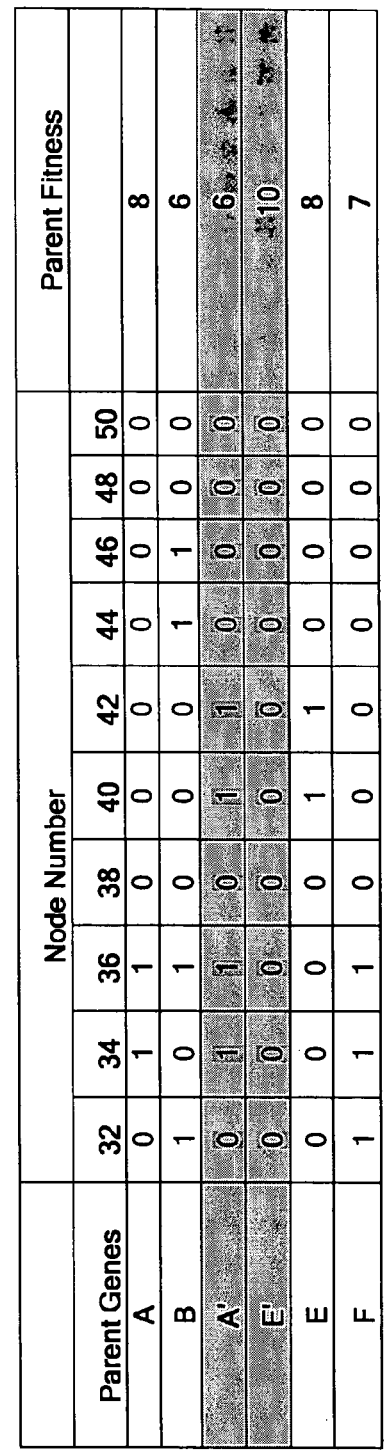
FIG. 3B is a table showing spliced genes.

FIGS. 1, 3A and 3B illustrate a preferred method 10 including steps 12 through 24 for optimizing a WDM optical ring network 30 illustrated in FIG. 2. The WDM optical network 30 includes ten (10) nodes identified by reference numerals 32, 34, 36, 38, 40, 42, 44, 46, 48 and 50. Each pair of adjacent nodes defines a path. For example, a path 52 exists between nodes 32 and 34. Each corresponding pair of nodes 34 and 36, 36 and 38, 38 and 40, 40 and 42, 42 and 44, 44 and 46, 46 and 48, 48 and 50, and 50 and 32 define paths 54, 56, 58, 60, 62, 64, 66, 68 and 70, respectively.

Each of the paths 52 through 70 in the WDM optical network 30 has a baseline demand. In order to keep the demand on a given path below the maximum line capacity, reconfigurable optical spectrum filters ("ROSF"), such as for example Remote Blocking Filters ("RBF"), are placed at various nodes in the WDM optical network 30. ROSFs allow bandwidth to be re-used on either side of the ROSF. For example, ROSFs at nodes 32 permit paths 52 and 70 to use the bandwidth dropped at node 32 without interference, since dropped wavelength cannot cross over the ROSF. This is referred to as wavelength reuse. Also, ROSFs may be remotely reconfigurable permitting the network to be readily modified.

The objective of the preferred method of the present invention is to determine the nodes where ROSFs should be located, while other nodes may be implemented without any filters or with less capable filters. This ensures that the capacity demand for each path in the network 30 is satisfied using the least amount of ROSFs. In this manner, the preferred method creates a robust and cost effective WDM optical network.

It will be readily appreciated that the term "WDM" as used herein shall include all forms of wavelength division multiplexing including WDM, CWDM and DWDM. While the preferred method is designed to determine the optimal placement of the reconfigurable optical spectrum filters, it will be readily appreciated that the present invention may be utilized to ascertain numerous other optical network configurations in an effort to optimize the optical network. Further, while FIG. 2 illustrates one possible network architecture to be optimized by the preferred method of the present invention, it will be readily appreciated that the present invention can be used on numerous other networks or portions thereof. The present invention may be used to optimize existing networks or to create new optimal networks.

Turning now to the preferred method 10, various network parameters are defined in the initial step 12. These network parameters include, for example, a node listing, the physical node connectivity paths, physical path characteristics, inter-node channel demands and identification of forced ROSF or nonROSF nodes. A forced ROSF node as used herein shall mean a node that must include an ROSF to achieve the objective of the network. In other words, it is not permissible to alter a forced ROSF node such that it no longer has an ROSF. Preferably, the number of nodes is determined in this step. While the example depicted in FIG. 2 includes ten nodes, it will be readily appreciated that the number of nodes may be varied as desired.

In step 14 of the preferred method 10 of the present invention, N parents are created each having a gene structure corresponding to the number of nodes in the WDM optical ring network or portion of the ring under consideration. For example, a node having a forced ROSF may be omitted from the gene structure since that node is already optimized. N is a whole number greater than or equal to 2. The N parents are created by placing ROSFs at random nodes in the network defined in the initial step. Subsequently, the cross-sectional demands on each path of the network 30 are calculated and ROSFs are randomly added to various nodes until each path is below the maximum limit, that is, the demand is less than the number of WDM channels available. In this manner, each parent is validated to support the desired traffic pattern. As is illustrated by table 80 (See FIG. 3), the genes of the parents include ten distinct pieces/chromosomes corresponding directly to the number of nodes in the WDM optical ring network. The 0's represent no ROSF present while the 1's designate the presence of an ROSF. However, if desired, the 0's could represent the presence of an ROSF and the 1's indicate the absence of an ROSF. It should also be noted that the genes of the parents may be structured to include information other than or in addition to the presence or absence of an ROSF at a given node. It will further be noted that while table 80 illustrates an example in which six (6) parents A through F are created, the number of parents created in step 14 may be varied as desired.

After the parents have been created, they are ranked in the third step 16 as illustrated in column 82 of table 80. Preferably, the parents are ranked according to one or more predetermined fitness criteria. In the preferred embodiment, the fitness criteria is based on the least number of ROSFs in the ring network 30. In other words, a parent having only two ROSFs will have a higher ranking due to the cost savings that this parent represents as compared to a parent having three or more ROSFs. However, as an alternative, the fitness criteria could be based on other parameters including but not limited to the shortest path, lowest capacity utilization, path complexity, or a combination of factors.

In step 18, the two parents having the highest fitness rankings A and E are selected and complementary sections of the genes from the father and mother are selected to create two children A' and E'. The selection process of the gene portions of the parents used to formulate the children is preferably random. In the examples disclosed herein, the gene portion of one parent includes three pieces and the gene portion of the other parent included seven pieces. Examples of the mating process are shown in table 80 (See FIG. 3A) and table 92 (See FIG. 3B). Specifically, Child A' is formed by splicing gene portion 84 of parent A and the corresponding gene portion 90 from parent E together. Child E' is formed by splicing gene portion 86 of parent A and the corresponding gene portion 88 from parent E together. While two children are created in this example, it will be readily appreciated that the number of children may vary.

In step 20 of the preferred method of the present invention, the children may be mutated with some probability of ROSF placement change. Preferably, mutation is performed by mutating a small fraction of the nodes. Specifically, filter types at a small number of nodes are randomly changed in this step. However, it should be noted that nodes that are forced are not changed during the mutation step. Mutation may be used to add ROSFs randomly where a child would not otherwise meet the network demands or merely to add a random variable.

In step 22, the children are tested to determine if they satisfy network demands. If the children do not pass this test, as shown by the line labeled NO, the mutation process may be repeated and the children subsequently retested. Alternatively, the child may be terminated as unfit.

A further alternative in the event that the child does not pass the test, is to perform the parent gene splicing at a different point. For example, a child could be formed by splicing the gene portion of parent A corresponding to nodes 32 and 34 with the gene portion of parent E corresponding to nodes 36 through 50. Of course, many other permutations are possible.

If the child survives, a parent is killed, i.e., is replaced by the child in step 24. Preferably, the parent with the lowest fitness ranking is replaced. In the example shown in table 92 (See FIG. 3B), child A' replaces parent C and child E' replaces parent D.

After step 24 is completed, steps 16 through 24 can be repeated as many times as desired. In this repetitive process, children are ranked beside parents and may be mated with the parents to allow for cross-generational mating. For example, A' can be mated with parent E. Alternatively, a new set of N children can be created based only on N parents without allowing children and parents to mate thus preventing cross-generational mating.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A method of determining the placement of one or more optical components in a WDM optical network having a plurality of nodes, comprising the steps of:
   (a) initially defining a WDM optical network or portion of a WDM optical network by selecting at least one component of the WDM optical network and at least one of the following:
      (i) number of nodes of the WDM optical network;
      (ii) node connectivity paths of the WDM optical network;
      (iii) physical path characteristics of the WDM optical network; and,
      (iv) inter-node channel demands of the WDM optical network;
   (b) determining the placement of the at least one component in the WDM optical network or portion of the WDM optical network using a genetic algorithm, said determining further comprises creating a plurality of parents for the WDM optical network or portion of the WDM optical network, each of the parents comprising a gene structure corresponding to the number of nodes in the WDM optical network or portion of the WDM optical network; and,
   (c) placing the at least one component in the WDM optical network or portion of the WDM optical network in accordance with the placement determined in step (b).

2. A method as recited in claim 1, wherein:
   (a) said at least one component comprises one of: (i) a reconfigurable optical spectrum filter; (ii) a waveguide; (iii) a regenerator, and (iv) a wavelength converter.

3. A method as recited in claim 1, wherein:
   (a) said at least one component comprises a reconfigurable optical spectrum filter.

4. A method as recited in claim 3, wherein:
   (a) said determining step comprises the steps of creating a plurality of parents for the WDM optical network or portion of the WDM optical network, each of the parents comprising a gene structure that corresponds to the number of nodes in the WDM optical network or portion of the WDM optical network.

5. A method as recited in claim 4, wherein:
   each gene of the plurality of parents further comprises information indicating whether a reconfigurable optical spectrum filter is present in each of the nodes of the WDM optical network or portion of the WDM optical network.

6. A method as recited in claim 1, wherein:
   (a) each gene further comprises information indicating whether the at least one component is present in at least one of the nodes of the WDM optical network or portion of the WDM optical network.

7. A method as recited in claim 1, wherein:
   (a) each gene further comprises information indicating whether the at least one component is present in each of the nodes of the WDM optical network or portion of the WDM optical network.

8. A method as recited in claim 7, further comprising the steps of:
   (a) ranking each of the plurality of parents in accordance with a predetermined fitness criteria;
   (b) creating a child comprising a gene structure corresponding to the number of nodes in the WDM optical network or portion of the WDM optical network by mating the two parents having the highest ranking.

9. A method as recited in claim 8, wherein:
   (a) said step of mating comprises the steps of randomly selecting a portion of the gene of one parent and randomly selecting a portion of the gene of the second parent and splicing the selected gene portions together to form a child.

10. A method as recited in claim 9, further comprising the steps of:
    (a) mating the child with one of said plurality of parents.

11. A method as recited in claim 10, wherein:
    (a) the step in paragraph (a) of claim 1 is only performed after the steps of mutating the child and subsequently testing the child to determine whether the child satisfies a predetermined criteria are performed.

12. A method as recited in claim 8, further comprising the steps of:
    (a) mutating the child;
    (b) testing the child subsequent to the mutating step to determine whether the child satisfies a predetermined criteria; and,
    (c) in the event that the child does not satisfy the predetermined criteria one of the following steps is performed:
       (i) mutate the child again; and, (ii) splice the two parent genes at a different point in the genes.

13. A method of determining at least one variable of a WDM optical network having a plurality of nodes, comprising the steps of:
    (a) initially defining one or more parameters for a WDM optical network or portion of a WDM optical network;
    (b) creating a plurality of parents each having a gene structure corresponding to the one or more parameters of the WDM optical network or portion of the WDM optical network, (c) mating two of the parent genes to form at least one child having a gene structure that corresponds to the one or more parameters;

(d) setting the at least one variable of the WDM optical network or portion of the WDM optical network at least in part based on the results from steps (b) through (c); and (e) configuring the WDM optical network or portion of the WDM optical network in accordance with the at least one variable set in step (d);

wherein the WDM optical network comprises N nodes, where N is a whole number equal to or greater than 3; and, (b) each of the genes of the plurality of parents comprises N portions.

14. A method as recited in claim 13, wherein:

(a) paragraph (d) of claim 13 is performed after steps of mutating the child and subsequently testing the child to determine whether the child satisfies a predetermined criteria are performed.

15. A method as recited in claim 13, wherein:

(a) the variable of the WDM optical network or portion of the WDM optical network comprises the location of reconfigurable optical spectrum filters in the WDM optical network.

16. A method of determining the placement of one or more optical components in a WDM optical network having a plurality of nodes, comprising the steps of:

(a) initially defining a WDM optical network or portion of a WDM optical network by selecting at least one component of the WDM optical network;

(b) determining the placement of said at least one component in the WDM optical network or portion of the WDM optical network using a genetic algorithm, said determining comprises determining which nodes are to have a reconfigurable optical spectrum filter; and, (c) placing the at least one component in the WDM optical network or portion of the WDM optical network in accordance with the placement determined in step (b);

wherein said genetic algorithm comprises;

(i) initially defining one or more parameters associated with the WDM optical network or portion of the WDM optical network;

(ii) creating a plurality of parents each having a gene structure corresponding to the one or more parameters of the WDM optical network or portion of the WDM optical network;

(iii) mating two of the parent genes to form at least one child having a gene structure that corresponds to the one or more parameters; and, (iv) setting the at least one variable of the WDM optical network or portion of the WDM optical network at least in part based on the results from the creating and mating steps; and, wherein the WDM optical network or portion of the WDM optical network comprises N nodes, where N is a whole number equal to or greater than 3; and, each of the genes of the plurality of parents comprises N portions.

17. A method as recited in claim 16, wherein:

(a) the WDM optical network comprises a ring network having a plurality of nodes.

* * * * *